United States Patent [19]
Deem

[11] 3,898,293
[45] Aug. 5, 1975

[54] PRODUCTION OF TETRAFLUOROETHYLENE OLIGOMERS
[75] Inventor: William Roy Deem, Runcorn, England
[73] Assignee: Imperial Chemical Industries Limited, London, England
[22] Filed: May 24, 1973
[21] Appl. No.: 363,314

Related U.S. Application Data
[63] Continuation-in-part of Ser. No. 15,275, Feb. 27, 1970, Pat. No. 3,758,618.

[30] Foreign Application Priority Data
Mar. 3, 1969  United Kingdom............... 11137/69
Aug. 1, 1969  United Kingdom............... 38721/69

[52] U.S. Cl. ..................... 260/653.1 R; 252/429 R
[51] Int. Cl. ......................... C07c 17/26; C08f 3/22
[58] Field of Search ...................... 260/653.1 R, 653

[56] References Cited
UNITED STATES PATENTS
3,758,618  9/1973  Deem........................... 260/653.1 R Primary Examiner—D. Horwitz
Attorney, Agent, or Firm—Cushman, Darby & Cushman

[57] ABSTRACT

A process for the preparation of oligomers of tetrafluoroethylene by interacting tetrafluoroethylene under anhydrous conditions at 50° to 120°C in the presence of a fluoride ion catalyst in a polar aprotic solvent, the improvement comprising the preparation of the fluoride ion catalyst by a. Preparing a mixture potassium fluoride or potassium acid fluoride and a quaternary ammonium chloride, bromide or iodide wherein the quaternary ammonium ion is selected from the group consisting of the tetraalkylammonium, alkenyltrialkylammonium and benzyltrialkylammonium ions in methanol;

b. removing from the mixture both the methanol by distillation and the precipitate of potassium chloride, bromide or iodide formed;

c. adding the said polar aprotic solvent to redissolve the quaternary ammonium fluoride.

7 Claims, No Drawings

PRODUCTION OF TETRAFLUOROETHYLENE OLIGOMERS

This is a continuation-in-part of copending application Ser. No. 15,275, filed on Feb. 27, 1970, and now U.S. Pat. No. 3,758,618.

This invention relates to the production of oligomers of tetrafluoroethylene.

In our U.K. specification No. 1,082,127 a method is disclosed of making oligomers of tetrafluoroethylene by contacting the monomer under anhydrous conditions with one or more fluorides of potassium, rubidium, caesium or of a quaternary ammonium ion. Caesium fluoride is expensive and a process using it can be economic only if it is possible to recover or regenerate it readily from the reaction system; we have not found this to be convenient. The tetraalkylammonium fluorides are tedious and time-consuming to prepare and are so hydroscopic that stringent precautions are necessary to keep them dry enough for use in the oligomerisation reaction.

We have now devised a method of using tetraalkylammonium compounds which avoids difficulties associated with the isolation and storage of the quaternary ammonium fluoride.

Thus according to the present invention there is provided a process for the preparation of oligomers of tetrafluoroethylene by interacting tetrafluoroethylene under anhydrous conditions at 50° to 120°C in the presence of a fluoride ion catalyst in a polar aprotic solvent the improvement comprising the preparation of the fluoride ion catalyst by a. mixing potassium fluoride or potassium acid fluoride and a quaternary ammonium chloride, bromide or iodide (wherein the quaternary ammonium ion is selected from the group consisting of the tetraalkylammonium, alkenyltrialkylammonium and benzyltrialkylammonium ions) in methanol;

b. removing from the mixture both the methanol by distillation and the precipitate of potassium chloride, bromide, or iodide formed;

c. adding the said polar aprotic solvent to dissolve the quaternary ammonium fluoride catalyst.

Optionally the catalyst solution in the polar aprotic solvent may be distilled to remove any remaining traces of methanol.

Methanol is chosen as the primary solvent because it is a solvent which possesses a unique balance of solvent properties. The methanol is used to dissolve both the quaternary ammonium halide and the potassium fluoride. The salts react in solution and a precipitate of the corresponding potassium halide is formed which may be separated from the fluoride catalyst which remains in solution. It is preferred to employ the quaternary ammonium chloride because potassium chloride is less soluble in methanol than potassium bromide and potassium iodide. These last-mentioned halides may not always precipitate immediately if a large volume of methanol is present; and it may be necessary to remove a portion of the methanol first to reduce the quantity of solvent present in order to allow the potassium halide to precipitate and finally remove this precipitate before distilling the rest of the methanol from the fluoride catalyst.

In one preferred method, for example, potassium fluoride and quaternary ammonium chloride, are first allowed to react together in a minimum quantity of methanol to give a solution of the reactants, whereupon the quaternary ammonium fluoride is formed as a solution in methanol and a precipitate of the potassium chloride is thrown out of solution. The latter is separated off and the methanolic solution distilled preferably under reduced pressure until about 75% of the methanol has been removed.

The oligomerisation reaction medium is a polar aprotic, preferably anhydrous, medium and examples are dimethylformamide, N-methylpyrrolidone, dimethylacetamide and dimethylethers of ethylene glycol and of diethylene glycol, of which dimethylformamide is particularly suitable.

Continuing the example given above a dry polar aprotic solvent, for example dimethylformamide is then added in sufficient quantity to dissolve the quaternary ammonium fluoride (for example the solubility of $(CH_3)_4NF$ in dimethylformamide is about 60g/litre) and the remaining methanol removed by distillation. Before the solution of quaternary ammonium fluoride is used for reaction with tetrafluoroethylene it is filtered to remove any residual potassium halide. The filtered solutions can be stored in sealed polythene bottles for several weeks if desired.

The quaternary ammonium radical can be tetraalkylammonium, for example tetramethylammonium, tetraethylammonium and triethylmethylammonium; or alkenyltrialkylammonium, for example allyltrimethylammonium and allyltriethylammonium; or aralkyltrialkylammonium, for example benzyltrimethylammonium or benzyltriethylammonium.

The oligomerisation reaction is conveniently carried out by adding the quaternary ammonium fluoride catalyst solution prepared as described above, with a small amount of a substance, for example alpha-pinene, that can inhibit free-radical polymerisation of tetrafluoroethylene, to a pressurised vessel, e.g., an autoclave fitted with a stirrer. The solution is stirred at room temperature and tetrafluoroethylene is introduced into the autoclave up to a moderate pressure, for example 100–400 lb/sq. inch gauge and the temperature raised to about 80°C. The pressure falls as reaction occurs and further tetrafluoroethylene is introduced to repressurise the system. The procedure is repeated over a period of several hours, for example 2 to 15, whilst the temperature is maintained within a range of about 50° to 120°C. When the oligomerisation has continued for a sufficient time the autoclave is cooled and the liquid layer of oligomers is separated from the reaction medium and any solid residues, and washed with a little fresh reaction medium and then dried over, for example, anhydrous sodium sulphate. The mixture of oligomers is then fractionated to give individual oligomers of which the pentamer usually accounts for about one-half of the total.

There is considerable advantage in the ease of handling the reactants, conducting the oligomerisation reaction and the yield of oligomers obtained by the use of a process of this invention compared with prior art processes.

The tetrafluoroethylene oligomers produced from the reactions herein described are observed to have spectroscopic and chemical properties corresponding to the formulae and structures hereinafter listed.

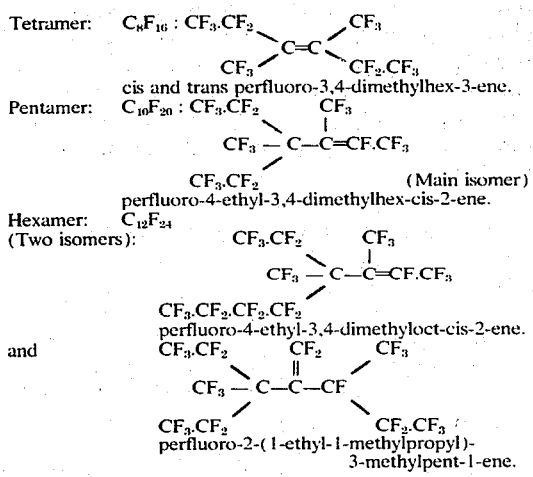

The perfluoroolefines produced by the process of this invention are thermally stable liquids which may be used as heat-transfer fluids or hydraulic fluids particularly in high temperature applications. Other uses of perfluoroolefines include fluid dielectrics, refrigerants, transformer fluids, and turbine impellents. A wide range of chemical derivatives of the oligomers may be made and a multitude of uses generally as additives to other materials can be envisaged ranging over nearly the whole of industry. The preparation of primary derivatives for example oxybenzene, carboxyl, sulphonyl and amino derivatives have been described in U.K. Pat. specifications Nos. 1,130,822; 1,148,486; 1,143,599; 1,155,607; 1,151,601; 1,176,492; 1,176,493; 1,176,494; 1,182,645; 1,270,661; 1,270,662 and U.K. Pat. application No. 8295/71. From such derivatives, by employing conventional chemical reactions, many other functional groups may be attached to the perfluoro group derived from the oligomers and the types of compound which may be produced include monomers and polymers, surface active agents, dyestuffs, greases and waxes, lacquers and other surface coatings, textile treatments or pharmaceuticals. All the types of compounds produced may have properties substantially different from those of conventional compounds by virtue of the properties imparted by the presence of the perfluorogroup in the molecule. The oligomers have a perfluoroolefinic structure as exemplified hereinbefore and may be fluorinated for example by methods described in "Advances in Fluorine Chemistry" by M. Stacey and J. C. Tatlow Vol. I. Butterworths 1960 or by passing the oligomer vapours over a bed of cobalt trifluoride heated to 150° to 250°C in a nickel tube to form branched perfluoroalkanes. These perfluorocarbons find application as solvents (mainly for other fluorine-containing compounds), coolants, stable oils and fluid dielectrics.

In textile technology compositions used as antistatic, lubricating or other processing aids may incorporate phosphate ester derivatives of oligomer-based compounds because of their stability and substantivity to surfaces.

Monomers and polymers containing oligomer-derived fluorocarbon groups may be made by the addition of polymerisable groups to the oligomer residue or to a derivative thereof.

Polymers and copolymers incorporating fluorocarbon chains derived from oligomers and intermediates, e.g., as described in U.K. Pat. specification No. 1,176,494 often possess a useful combination of hydrophobic, oleophobic and non-adhesive properties.

A variety of uses of tetrafluoroethylene oligomer-based surfactants or similar oligomer derivatives depend upon leaving a stable layer of fluorocarbon material which resists contamination and has oleophobic properties on a surface which may be a glass, a plastic, a metal, a powder, a textile or human skin. Thus they find many applications in cosmetic preparations and in release coatings for example in cookery.

A range of co-ordination compounds containing tetrafluoroethylene oligomer residues may be prepared by means of reaction between salts of metals (which include for example chromium, aluminium, vanadium, titanium, tin, lead, iron, nickel and cobalt) with oligomer derivatives, especially the carboxylic acid derivatives; but derivatives which include other co-ordinating groups for example other acids, alcohols or amines may be used to prepare co-ordination compounds. For example the complexes prepared by reacting chromyl chlorides with various oligomer-derived carboxylic acids according to methods described in U.K. Pat. Nos. 712,784; 1,002,324 have been shown to impart remarkable water and oil repellency to porous materials.

Examples of carboxylic acids made from tetrafluoroethylene pentamer from which metal complexes may be derived include the acids $C_{10}F_{19}OC_6H_4COOH$, $C_{10}F_{19}NH(CH_2)_3COOH$ and $(C_2F_5)_2(CF_3).CCH_2.COOH$.

The chromium complexes of these acids or analogous complexes of other metals, for example aluminium, adhere tenaciously to many substances and may be used for treating paper and textiles where colour is not important, for example in tents or army uniforms and disposable articles, for instance, hospital drapes. They may also be used to impart a hydrophobic surface to wood, ceramics or leather.

The oligomer derivatives and other materials present in particular compositions for the many applications hereinbefore described may be conveniently dispersed in aerosol form. An organic or aqueous solution or dispersion to which a propellent is added may be sealed in an aerosol container and stored ready for use as required.

The invention is illustrated but in no way limited by the following Examples:

EXAMPLE 1

Dry tetramethylammonium chloride (293g, 4.5 moles) in dry methanol (1,000 ml) was added to a stirred solution of anhydrous potassium fluoride (261g, 4.5 moles) in dry methanol (3,600 ml) at ambient temperature under an atmosphere of dry nitrogen. After about 1 minute a white crystalline precipitate of potassium chloride was formed. The crystalline precipitate was filtered to give a clear methanolic solution of tetramethylammonium fluoride. Dry dimethylformamide (7,500 ml) was added to the methanolic solution of tetramethylammonium fluoride contained in a 20 litre distillation apparatus. The methanol was distilled off from the reaction mixture by heating between 60° to 70°C and under a reduced pressure of 10–15 mm Hg. When all the methanol (4,600 ml) and some of the dimethylformamide had been removed, the solution of tetramethylammonium fluoride in dimethylformamide was allowed to cool to ambient temperature under reduced pressure, and then the pressure increased to atmospheric by admitting dry nitrogen. The cooled solution of tetramethylammonium fluoride in dimethylformamide was filtered again in order to remove any solid precipitate that may have settled out during cooling.

The solution of tetramethylammonium fluoride in dry dimethylformamide (7,000 ml) and alpha-pinene was placed in a dry 25 litre stainless steel autoclave fitted with a stirrer. The autoclave was sealed, swept out with dry nitrogen and tetrafluoroethylene introduced to a pressure of 200 lb/sq. inch gauge. The reaction mixture was then stirred and the temperature raised slowly to a maximum of 80°C until there was a pressure drop of 200 lb/sq. inch. The reaction system was repressurised several times with tetrafluoroethylene over the range 160–225 lb/sq. inch gauge and the temperature maintained at 55° to 87°C for 5½ hours. The autoclave was then cooled to ambient temperature, the excess pressure released and the tetrafluoroethylene oligomers blown out of the vessel with nitrogen. The yield of oligomers was 6555g.

EXAMPLES 2–12

The process was carried out using either tetramethylammonium chloride or triethylmethylammonium chloride with potassium fluoride in the same manner as described in Example 1 but under the particular conditions shown in Table 1.

The results are presented in Table 1.

ments, as required to maintain the temperature at 45° to 50°C. When the pressure reached 60 psig the temperature was raised to 90°C, and the pressure by increments to 300 psig. After 3 hours, under these conditions the autoclave was cooled to ambient temperature, vented and its contents discharged. 300g of oligomers were produced.

What we claim is:

1. A process for the preparation of oligomers of tetrafluoroethylene by interacting tetrafluoroethylene under anhydrous conditions at 50° to 120°C in the presence of a fluoride ion catalyst in a polar aprotic solvent, the improvement comprising the preparation of the fluoride ion catalyst by
   a. preparing a mixture potassium fluoride or potassium acid fluoride and a quaternary ammonium chloride, bromide or iodide wherein the quaternary ammonium ion is selected from the group consisting of the tetraalkylammonium, alkenyltrialkylammonium and benzyltrialkylammonium ions in methanol;
   b. removing from the mixture both the methanol by distillation and the precipitate of potassium chloride, bromide or iodide formed;
   c. adding the said polar aprotic solvent to redissolve the quaternary ammonium fluoride.

2. A process for the preparation of oligomers of tetrafluoroethylene by interacting tetrafluoroethylene under anhydrous conditions at 50° to 120°C in the pres-

TABLE 1

| Ex. | Quarternary Ammonium Compound (NR$_4$Cl) | (gms) | Volume of Methanol added to NR$_4$Cl (ml) | Weight of Potassium Fluoride (KF) (gm) | Volume of Methanol added to (KF) (ml) | Volume of Dimethylformamide (ml) | Oligomerisation Conditions | | | Oligomer Formed (gm) | Production Rate (gm/hr) |
|---|---|---|---|---|---|---|---|---|---|---|---|
| | | | | | | | Pressure Range (psig) | Temp. Range (°C) | Reaction Time (hrs) | | |
| 2 | (CH$_3$)$_4$NCl | 493 | 1000 | 261 | 3600 | 8000 | 100–240 | 52–80 | 11.25 | 16095 | 1430 |
| 3 | (CH$_3$)$_4$NCl | 330 | 650 | 241 | 4500 | 8000 | 140–250 | 60–78 | 6.37 | 11698 | 1835 |
| 4 | (CH$_3$)$_4$NCl | 203 | 600 | 204 | 2800 | 8000 | 200–240 | 52–86 | 4.75 | 9300 | 1960 |
| 5 | (CH$_3$)$_4$NCl | 203 | 600 | 204 | 2800 | 8000 | 160–280 | 61–74 | 6.93 | 9225 | 1335 |
| 6 | (C$_2$H$_5$)$_3$CH$_3$$^+$$^-$HCl | 845 | 3000 | 350 | 3000 | 8000 | 100–240 | 45–82 | 11.00 | 12612 | 1145 |
| 7 | " | 845 | 1000 | 350 | 3000 | 7500 | 110–240 | 58–86 | 10.0 | 13761 | 1376 |
| 8 | " | 845 | 1500 | 350 | 3500 | 7500 | 75–270 | 48–67 | 5.88 | 7445 | 1265 |
| 9 | " | 845 | 1500 | 350 | 3500 | 7500 | 140–250 | 50–84 | 10.5 | 14830 | 1410 |
| 10 | " | 845 | 1500 | 350 | 3500 | 8000 | 100–250 | 59–78 | 7.5 | 14034 | 1870 |
| 11 | " | 845 | 1500 | 350 | 3500 | 8000 | 110–240 | 58–79 | 5.53 | 12168 | 2200 |
| 12 | " | 845 | 1500 | 350 | 3500 | 8000 | 100–230 | 56–75 | 5.82 | 18402 | 3170 |

EXAMPLE 13

360 mls of a solution of benzyltriethylammonium chloride in anhydrous methanol, shown by volumetric analysis to contain 39.6g of chloride ion, (equivalent to 265g [1.1. moles] of the quaternary ammonium salt) was added to a solution of 71g (1.20 moles) of anhydrous potassium fluoride in 900 mls of anhydrous methanol. The resulting precipitate of potassium chloride was filtered off.

The filtrate was transferred to a vacuum distillation apparatus and distilled to remove the bulk of the methanol. The pressure was adjusted as required to keep the boiling point below 70°C. The solution was then diluted with 500 mls of dry dimethylformamide and refiltered.

189g of this solution was transferred to a dry "Inconel" autoclave fitted with a stirrer. The autoclave was purged with dry nitrogen, evacuated and heated to 45°C. Tetrafluoroethylene was introduced in increence of a fluoride ion catalyst in a polar aprotic solvent the improvement comprising the preparation of the fluoride ion catalyst by
   a. mixing potassium fluoride or potassium acid fluoride and a quaternary ammonium chloride wherein the quaternary ammonium ion is selected from the group consisting of the tetraalkylammonium, alkenyltrialkylammonium and benzyltrialkylammonium ions in methanol;
   b. removing the precipitate of potassium chloride formed;
   c. separating at least part of the methanol by distillation;
   d. adding the said polar aprotic solvent and
   e. distilling the catalyst solution again to remove the remaining methanol.

3. A process as claimed in claim 1 wherein the quaternary ammonium ion is the tetramethylammonium or the tetraethylammonium ion.

4. A process as claimed in claim 1 wherein the quaternary ammonium ion is methyl(triethyl)ammonium ion.

5. A process as claimed in claim 1 wherein the quaternary ammonium ion is the benzyl(trimethyl) ammonium or benzyl(triethyl)ammonium ion.

6. A process as claimed in claim 1 wherein the polar aprotic reaction medium is selected from the group consisting of dimethylformamide, N-methylpyrrolidone, dimethylacetamide, the dimethyl ether of ethylene glycol and the dimethyl ether of diethylene glycol.

7. A process as claimed in claim 1 wherein the tetrafluoroethylene is reacted under a pressure of 100 to 400 lb/sq. inch gauge.

* * * * *